US006971948B2

(12) United States Patent
Valek et al.

(10) Patent No.: US 6,971,948 B2
(45) Date of Patent: Dec. 6, 2005

(54) METHOD AND APPARATUS FOR REMOVING COATINGS APPLIED TO SURFACES OF A SUBSTRATE

(75) Inventors: Timothy J. Valek, Spring Green, WI (US); Roger D. O'Shaughnessy, Chaska, MN (US)

(73) Assignee: Cardinal CG Company, Eden Prairie, MN (US)

( * ) Notice: Subject to any disclaimer, the term of this patent is extended or adjusted under 35 U.S.C. 154(b) by 238 days.

(21) Appl. No.: 10/071,420

(22) Filed: Feb. 8, 2002

(65) Prior Publication Data

US 2002/0132564 A1 Sep. 19, 2002

Related U.S. Application Data

(60) Provisional application No. 60/267,923, filed on Feb. 8, 2001, provisional application No. 60/267,507, filed on Feb. 8, 2001, and provisional application No. 60/274,363, filed on Mar. 8, 2001.

(51) Int. Cl.[7] .................................................. B24B 7/00

(52) U.S. Cl. .......................... 451/190; 451/194; 451/57

(58) Field of Search ................................ 451/190, 194, 451/132, 133, 134, 262, 267, 57, 58, 65, 44, 41

(56) References Cited

U.S. PATENT DOCUMENTS

| | | | | |
|---|---|---|---|---|
| 2,723,427 A | | 11/1955 | Bobel | |
| 2,781,561 A | | 2/1957 | Gifford et al. | |
| 2,905,983 A | | 9/1959 | Ritz | |
| 3,024,881 A | | 3/1962 | Haas | |
| 3,167,823 A | | 2/1965 | Palfey | |
| 3,643,278 A | * | 2/1972 | Harris et al. | 15/77 |
| 4,166,018 A | | 8/1979 | Chapin | |
| 4,513,543 A | * | 4/1985 | Lawrenson et al. | 451/41 |
| 4,587,769 A | | 5/1986 | Cathers | |
| 4,630,407 A | * | 12/1986 | Rhodes | 451/53 |
| 4,716,686 A | | 1/1988 | Lisec | |
| 4,947,604 A | | 8/1990 | Sylvester | |
| 5,153,054 A | | 10/1992 | Depauw et al. | |
| 5,227,206 A | | 7/1993 | Bachli | |
| 5,394,269 A | | 2/1995 | Takamatsu et al. | |
| 5,424,130 A | | 6/1995 | Nakanishi et al. | |
| 5,547,825 A | | 8/1996 | Takahashi et al. | |
| 5,616,532 A | | 4/1997 | Heller et al. | |
| 5,626,911 A | | 5/1997 | Bertin et al. | |
| 5,653,073 A | | 8/1997 | Palmer | |
| 5,698,262 A | | 12/1997 | Soubeyrand et al. | |
| 5,849,200 A | | 12/1998 | Heller et al. | |
| 5,853,866 A | | 12/1998 | Watanabe et al. | |

(Continued)

FOREIGN PATENT DOCUMENTS

| | | | |
|---|---|---|---|
| DE | 3800732 A1 | 1/1988 | |
| DE | 4419963 C | 6/1994 | |
| EP | 0709348 A1 | 10/1995 | |
| EP | 1167312 A1 | 6/2001 | |
| EP | 1 182 174 A1 | 2/2002 | C03C/17/23 |
| WO | WO 00/43711 | 7/2000 | |

*Primary Examiner*—Dung Van Nguyen
(74) *Attorney, Agent, or Firm*—Fredrikson & Byron, P.A.

(57) ABSTRACT

The present invention relates to methods and apparatus for removing coatings from generally opposed first and second major surfaces of a substrate. The method includes providing a table having a surface for slidable receipt of the substrate. First and second grinding apparatuses are provided at a mounting portion of the table, opposite one another. As the substrate moves over the table surface, it contacts the first and second grinding apparatuses. The coatings are simultaneously removed from the first major surface with the first grinding apparatus from the second major surface with the second grinding apparatus.

12 Claims, 9 Drawing Sheets

U.S. PATENT DOCUMENTS

| | | | |
|---|---|---|---|
| 5,854,169 | A | 12/1998 | Heller et al. |
| 5,873,203 | A | 2/1999 | Thiel |
| 5,874,701 | A | 2/1999 | Watanabe et al. |
| 5,934,982 | A | 8/1999 | Vianello et al. |
| 5,939,194 | A | 8/1999 | Hashimoto et al. |
| 5,961,843 | A | 10/1999 | Hayakawa et al. |
| 6,013,372 | A | 1/2000 | Hayakawa et al. |
| 6,055,783 | A | 5/2000 | Guhl et al. |
| 6,090,489 | A | 7/2000 | Hayakawa et al. |
| 6,139,803 | A | 10/2000 | Watanabe et al. |
| 6,165,256 | A | 12/2000 | Hayakawa et al. |
| 6,165,619 | A | 12/2000 | Ikenaga et al. |
| 6,191,062 | B1 | 2/2001 | Hayakawa et al. |
| 6,210,779 | B1 | 4/2001 | Watanabe et al. |
| 2002/0003019 | A1 | 1/2002 | Goerenz et al. |
| 2002/0045073 | A1 | 4/2002 | Finley |
| 2003/0084625 | A1 | 5/2003 | Iguchi et al. |

* cited by examiner

METHOD AND APPARATUS FOR REMOVING COATINGS APPLIED TO SURFACES OF A SUBSTRATE

FIELD OF THE INVENTION

The present invention relates generally to a method of removing coatings applied to surfaces of a substrate. More particularly, the present invention relates to a method of simultaneously removing coatings applied to generally opposed major surfaces of a substrate, for example, a glass sheet.

BACKGROUND OF THE INVENTION

Coatings are frequently applied to the surfaces of glass sheets to provide the glass sheets with desirable characteristics. The coatings applied to the glass sheets vary widely and may include low-emissivity coatings, photocatalytic coatings, anti-reflective coatings, hydrophobic coatings, or hydrophilic coatings. Further, a coating may be applied simply to impart a specific color to the glass sheet.

A low emissivity coating may be applied to a glass sheet to reduce the passage of infrared radiation through the glass. This reduces loss or gain of heat through glass, thereby enhancing the ability to control the temperature in the building. Low-emissivity coatings are well known in the art and typically include one or more layers of infrared-reflective metal and one or more transparent dielectric layers. The infrared-reflective layers, which are typically conductive metals such as silver, gold, or copper, reduce the transmission of radiant heat through the coating. The transparent dielectric layers are used primarily to reduce visible reflectance and to control other properties of the coatings, such as color. Commonly used transparent dielectrics include oxides of zinc, tin, indium, bismuth, and titanium, and alloys and mixtures thereof, as well as certain nitrides (e.g., silicon nitride and titanium nitride). Low-emissivity coatings are commonly deposited on glass substrates through the use of well known magnetron sputtering techniques.

Photocatalytic coatings may be applied to glass sheets to provide self-cleaning characteristics to the glass. A photocatalytic coating applied to the outer surfaces of a glass sheet window reduces the time and cost associated with cleaning the outer surface of the window. The field of photocatalytic coating technology is founded on the ability of certain materials to absorb radiation and photocatalytically degrade organic materials such as oil, plant matter, fats, and greases. The most powerful of these photocatalytic materials appears to be titanium oxide. However, other materials are believed to exhibit photoactivity as well. These materials include oxides of iron, silver, copper, tungsten, aluminum, zinc, strontium, palladium, gold, platinum, nickel, and cobalt. Useful photocatalytic coatings are described in U.S. Pat. No. 5,874,701 (Watanabe et al), U.S. Pat. No. 5,853,866 (Watanabe et al), U.S. Pat. No. 5,961,843 (Hayakawa et al.), U.S. Pat. No. 6,139,803 (Watanabe et al), U.S. Pat. No. 6,191,062 (Hayakawa et al.), U.S. Pat. No. 5,939,194 (Hashimoto et al.), U.S. Pat. No. 6,013,372 (Hayakawa et al.), U.S. Pat. No. 6,090,489 (Hayakawa et al.), U.S. Pat. No. 6,210,779 (Watanabe et al), U.S. Pat. No. 6,165,256 (Hayakawa et al.), and U.S. Pat. No. 5,616,532 (Heller et al.), the entire contents of each of which are incorporated herein by reference.

Hydrophobic coatings are applied to glass to repel water, thus causing the water to bead up, rather than spreading into a sheet. U.S. Pat. No. 5,424,130 to Nakanishi, et al., the teachings of which are incorporated herein by reference, suggests coating a glass surface with a silica-based coating which incorporates fluoroalkyl groups. The reference teaches applying a silicone alkoxide paint onto the surface of the glass, drying the paint and then burning the dried paint in air.

Hydrophobic (i.e., "water repellent") coatings tend to cause water on the surface of the glass to bead up. If the coating is applied to an automobile windshield or the like where a constant flow of high velocity air is blowing over the surface, this water beading effect can help remove water from the glass surface by allowing the droplets to blow off the surface. However, in more quiescent applications, these droplets will tend to sit on the surface of the glass and slowly evaporate. As a consequence, this supposed "water repellent" coating will not solve the water-related staining problems noted above. To the contrary, by causing the water to bead up more readily, it may actually exacerbate the problem.

Thus, it may be desirable to produce glass bearing a hydrophilic coating. Hydrophilic coatings have an affinity for water and tend to cause water applied thereto to sheet. As described in U.S. patent application Ser. Nos. 09/868,542, 09/868,543, 09/599,301, and 09/572,766, the entire contents of each of which are incorporated herein by reference, hydrophilic coatings may be particularly advantageous when used on architectural glass and other substrates. For example, these coatings may resist formation of stains left by sitting water droplets, thereby promoting a longer lasting clean appearance.

Antireflective coatings may also be applied to the surface of a glass sheet. For example, U.S. Pat. No. 5,394,269 to Takamatsu, et al., the entire teachings of which are incorporated herein by reference, proposes a "minutely rough" silica layer on the surface of glass to reduce reflection. The roughened surface is achieved by treating the surface with a supersaturated silica solution in hydrosilicofluoric acid to apply a porous layer of silica on the glass sheet.

It is conventional to apply coating entirely over the coated surface of glass sheets used for architectural or automotive applications. Glass sheets can be coated using a variety of different coating methods. Sputter deposition is a large area coating method that is well suited for the application of thin films. Sputtering is fairly conventional in the architectural and automotive glass industries. For example, magnetron sputtering equipment and processes are well known in the present art. Magnetron sputtering chambers and methods are described in U.S. Pat. No. 4,166,018 (Chapin), the entire teachings of which are incorporated herein by reference.

As noted above, low-emissivity coatings typically comprise one or more infrared-reflective metallic layers. These metallic layers are commonly formed of silver, which is quite vulnerable to chemical attack. For example, silver is known to corrode when exposed to oxygen and moisture. When the silver in a low-emissivity coating corrodes, there is typically an attendant degradation of coating quality. For example, corrosion of the silver in a low-emissivity coating may reduce the infrared reflectivity of the coating, hence jeopardizing its intended function. This corrosion may also negatively impact the aesthetic appearance of the coated article. As a result, low-emissivity coatings are typically limited to use on the inner surfaces of multiple-pane insulating glass units (i.e., IG units), where these coatings are protected from the ambient environment.

Substrates bearing interior low-emissivity coatings are preferably edge deleted before being incorporated into IG units. A typical double-glazed IG unit comprises two panes held in a spaced-apart relationship by a spacer. The confronting, inner surfaces of the panes define between them a sealable between-pane space. Commonly, the inner surface of one of the panes bears a low-emissivity coating.

Low-emissivity coatings are typically less than ideal for bonding with a spacer. As noted above, these coatings tend to lack chemical stability. This makes it difficult to durably bond a spacer to a surface bearing such a coating. For example, when the infrared-reflective material in a low-emissivity coating corrodes, it may be difficult to form or maintain a strong bond with the corroded surface. Thus, to provide durable bonding of the spacer to the thus coated surface, it is advantageous to remove the low-emissivity coating from the area of the inner pane surface to which the spacer will be bonded. This process is referred to as "edge deletion".

It is known to perform edge deletion of interior low-emissivity coatings. In this regard, reference is made to U.S. Pat. No. 4,716,686 (Lisec) and U.S. Pat. No. 5,934,982 (Vianello et al.), the entire teachings of each of which are incorporated herein by reference.

Unlike interior low-emissivity coatings, exterior coatings typically do not suffer from the corrosion problems discussed above. Thus, edge deletion has traditionally not been performed on exterior coatings. However, it would be advantageous to perform edge deletion of exterior coatings as well as interior coatings. Thus, it would be desirable to provide methods and equipment for removing coatings from both major surfaces of a glass sheet, particularly if both coatings could be removed simultaneously.

SUMMARY OF THE INVENTION

The present invention relates to a method and apparatus of removing coatings from first and second generally opposed major surfaces of a glass sheet or other substrate. The method includes providing a table with a plurality of rollers for slidably supporting the sheets. First and second grinding apparatuses are mounted at one end of the table, opposite one another. As a substrate, having coatings applied to generally opposed first and second major surfaces thereof, is moved over the rollers, the coatings are preferably simultaneously removed from the first major surface of the substrate with the first grinding apparatus and from the second major surface of the substrate with the second grinding apparatus.

In one embodiment, the invention provides a method of removing coatings from portions of generally opposed first and second major surfaces of a substrate. These surface portions comprise a width and a depth of coatings to be removed. The method comprises providing a table having a table surface for slidable receipt of a substrate. A first grinding apparatus is provided at a mounting portion of the table. A second grinding apparatus is also provided at the mounting portion of the table, opposite the first grinding apparatus. The substrate is moved relative to the table surface such that the portions of the first and second surfaces of the substrate contact the first and second grinding apparatuses. Coating is removed from the first surface using the first grinding apparatus while simultaneously removing coating from the second surface using the second grinding apparatus.

In another embodiment, the invention provides an apparatus for removing coatings from portions of first and second surfaces of a substrate. These surface portions comprise a width and a depth of coatings to be removed. The apparatus comprises a support surface configured for slidable receipt of a substrate. The support surface includes a mounting portion. A first grinding apparatus is mounted at the mounting portion of the support surface. A second grinding apparatus is mounted at the mounting portion of the support surface, opposite the first grinding apparatus.

In still another embodiment, the invention provides a method of removing coatings from a substrate. The method comprises providing a substrate having generally opposed first and second surfaces. Each surface bears a functional coating. Substantially all of the functional coating is removed from a peripheral region of the first major surface while substantially all of the functional coating is simultaneously removed from a peripheral region of the second major surface.

In yet another embodiment, the invention provides an apparatus for removing coatings from portions of first and second surfaces of a substrate. These surface portions comprise a width and a depth of coatings to be removed. The apparatus comprises a table having a table surface for slidable receipt of a substrate. The table includes a mounting portion and an access recess for an operator. A first grinding apparatus is mounted at the mounting portion of the table. A second grinding apparatus is mounted at the mounting portion of the stable, opposite the first grinding apparatus. The apparatus includes a first height adjustment mechanism to control a distance of the first grinding apparatus from the substrate and a second height adjustment mechanism to control a distance of the second grinding apparatus from the substrate. If so desired, a single height adjustment mechanism may be provided to control the distances of both grinding apparatuses from the substrate.

DETAILED DESCRIPTION OF PREFERRED EMBODIMENTS

Figure 1:
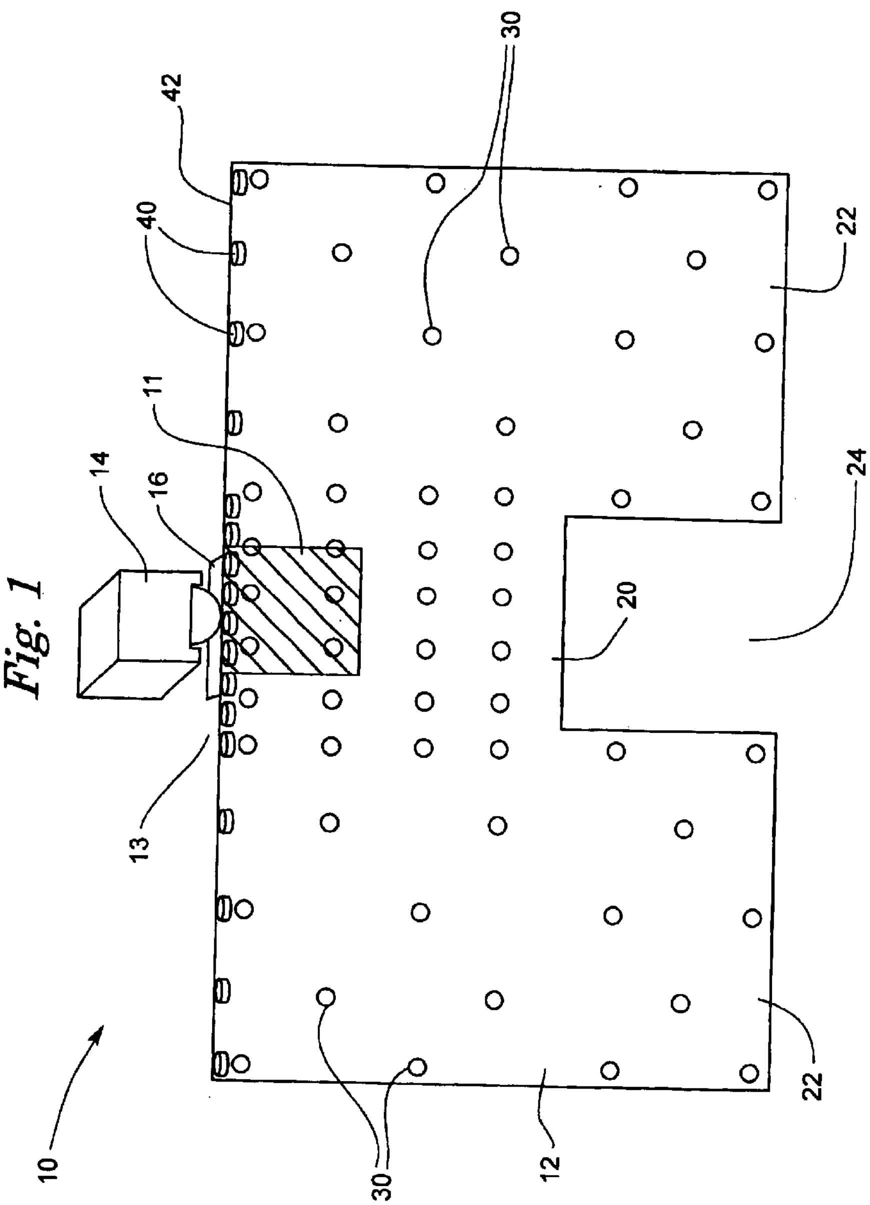
FIG. 1 is a perspective view of an apparatus for removing coatings from the surfaces of a substrate according to the present invention.

The present invention is directed to an apparatus 10 and method for removing coatings that have been applied to generally opposed major surfaces of a substrate, as illustrated in FIG. 1. In particular, the apparatus and method is suitable for removing coatings that have been applied to a glass sheet.

A wide variety of coating types may be applied to the substrate. For example, any one or more of the coatings described above may be used. In some embodiments, the coating applied to the first major surface is photocatalytic. Alternatively, the coating applied to the first major surface may be a hydrophilic coating, an anti-reflective coating, a hydrophobic coating, or any other desirable coating. The coating applied to the second major surface will commonly be a low-emissivity coating but may alternatively be photocatalytic, hydrophilic, anti-reflective, or have any other desired characteristic. The coatings applied to the first and the second major surfaces may be the same or may differ from one another.

It is to be understood that the coatings on both sides of the substrate 11 can be of any desired type, and the invention is by no means limited to removal of any particular types of coatings. However, in certain embodiments of the invention, a photocatalytic coating is applied to one major surface of the glass sheet and a low-emissivity coating is applied to the other major surface of the glass sheet. For example, a glass sheet may be coated with a low-emissivity coating on its interior facing surface (which ultimately may be oriented toward the between-pane space of an insulating glass unit) and a photocatalytic coating on its exterior facing surface (which ultimately may be oriented toward an environment other than the between-pane space of an IG unit). The present equipment and/or methods are then used to remove portions of the photocatalytic and low-emissivity coatings. In other embodiments, a hydrophilic coating is applied to one major surface of the glass sheet and a low-emissivity coating is applied to the other major surface of the glass sheet. For example, a glass sheet may be coated with a low-emissivity coating on its interior facing surface and a hydrophilic coating on its exterior facing surface. The present equipment and/or methods are then used to remove portions of the hydrophilic and low-emissivity coatings. Many other embodiments of this nature will be apparent to skilled artisans given the present teaching as a guide.

As seen in FIGS. 1–7, the coating removal apparatus 10 generally includes a table 12, a first grinding apparatus 14, and a second grinding apparatus 16. The first grinding apparatus 14 and the second grinding apparatus 16 are positioned at one end of the table 12, opposite one another. To properly position the second grinding apparatus 14 opposite the first grinding apparatus 16, it may be advantageous to provide a slot 15 through which a portion of the second grinding apparatus 14 may extend. Coatings are easily removed from a substrate, for example, a glass sheet, using a grinding process. The coating removal apparatus 10 reduces the time associated with the grinding process because the coating is simultaneously ground off both sides of the substrate 11. Additionally, the consistency of the grinding process is enhanced when compared to the prior art coating removal apparatuses that only remove the coating from one side of the substrate at a time.

The table 12 is configured with a length and width such that the table 12 provides support for a substantial portion of the substrate 11. The table 12 is preferably fabricated from a rigid material that resists deformation during use. One suitable material for fabricating the table 12 is aluminum. However, any other suitable material may be used.

In one embodiment, shown in detail in FIG. 1, the table 12 includes a central section 20 and a pair of end sections 22 extending parallel to one another from either end of the central section 20 such that the table 12 is preferably in the shape of the letter C. An access recess 24 is thereby formed between the central section 20 and the end sections 22. The first and second grinding apparatuses 14 and 16, respectively, are positioned opposite one another at a mounting portion 13 of the table.

The specific configuration of the table as shown in FIG. 1 is easily used for grinding coatings from substrates of a wide range of sizes. The recess 24 enables a person operating the coating removal apparatus 10 to stand relatively close to the first and second grinding apparatuses 14, 16 when using the coating removal apparatus 10 with relatively small pieces of a substrate 11. Further, the C-shaped configuration of the table 12 provides a relatively large surface area to support large pieces of a substrate 11. While the C-shaped table configuration is advantageous, it is noted, that any table configuration may be used within the scope of the invention to provide opposing first and second grinding apparatuses for simultaneously removing coatings from first and second generally opposed major surfaces of a substrate. For example, the concepts of the present invention may also be utilized with a table 12 having alternative configurations such as being substantially rectangular.

Figure 2:
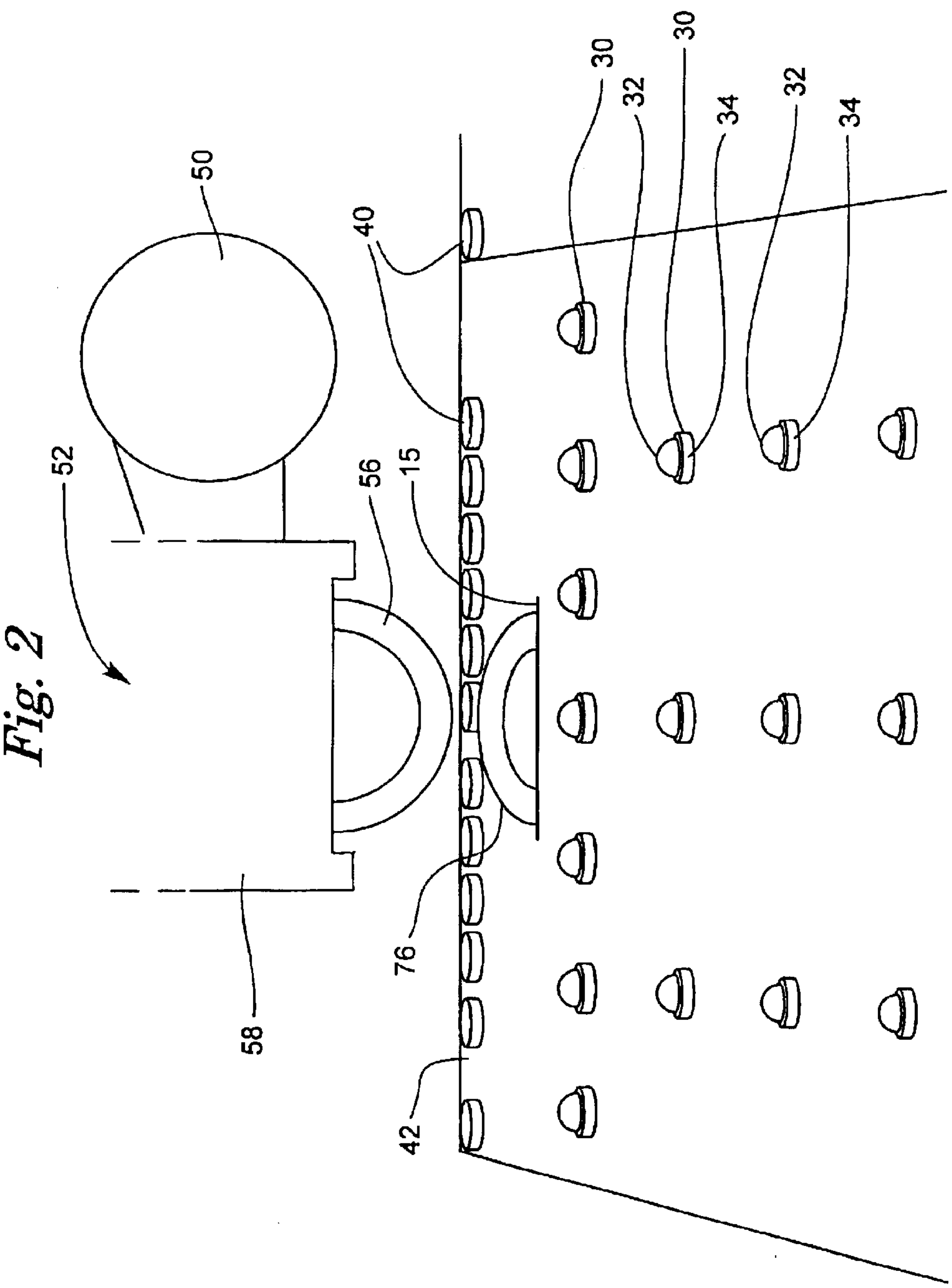
FIG. 2 is an enlarged perspective view of the coating removal apparatus.
Figure 3:
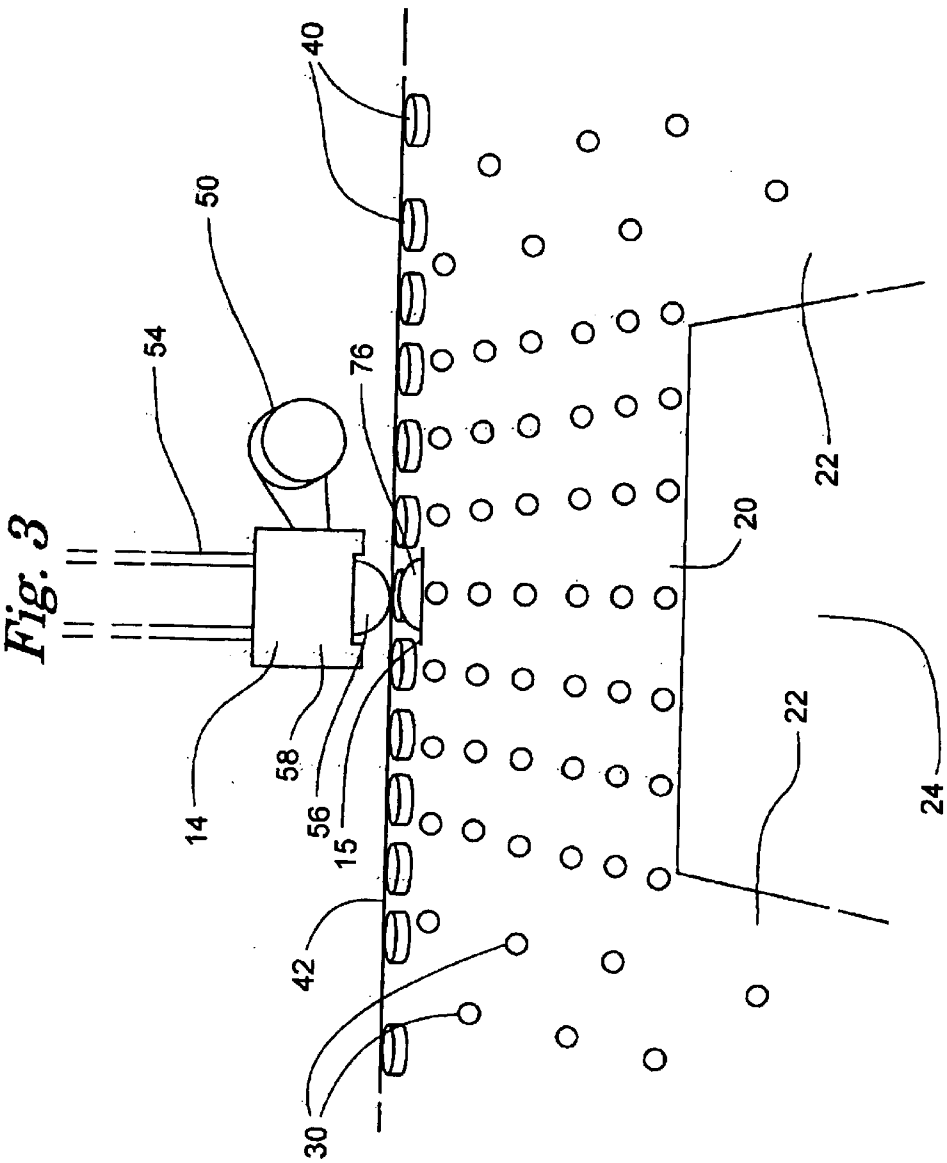
FIG. 3 is a second enlarged perspective view of the coating removal apparatus.
Figure 4:
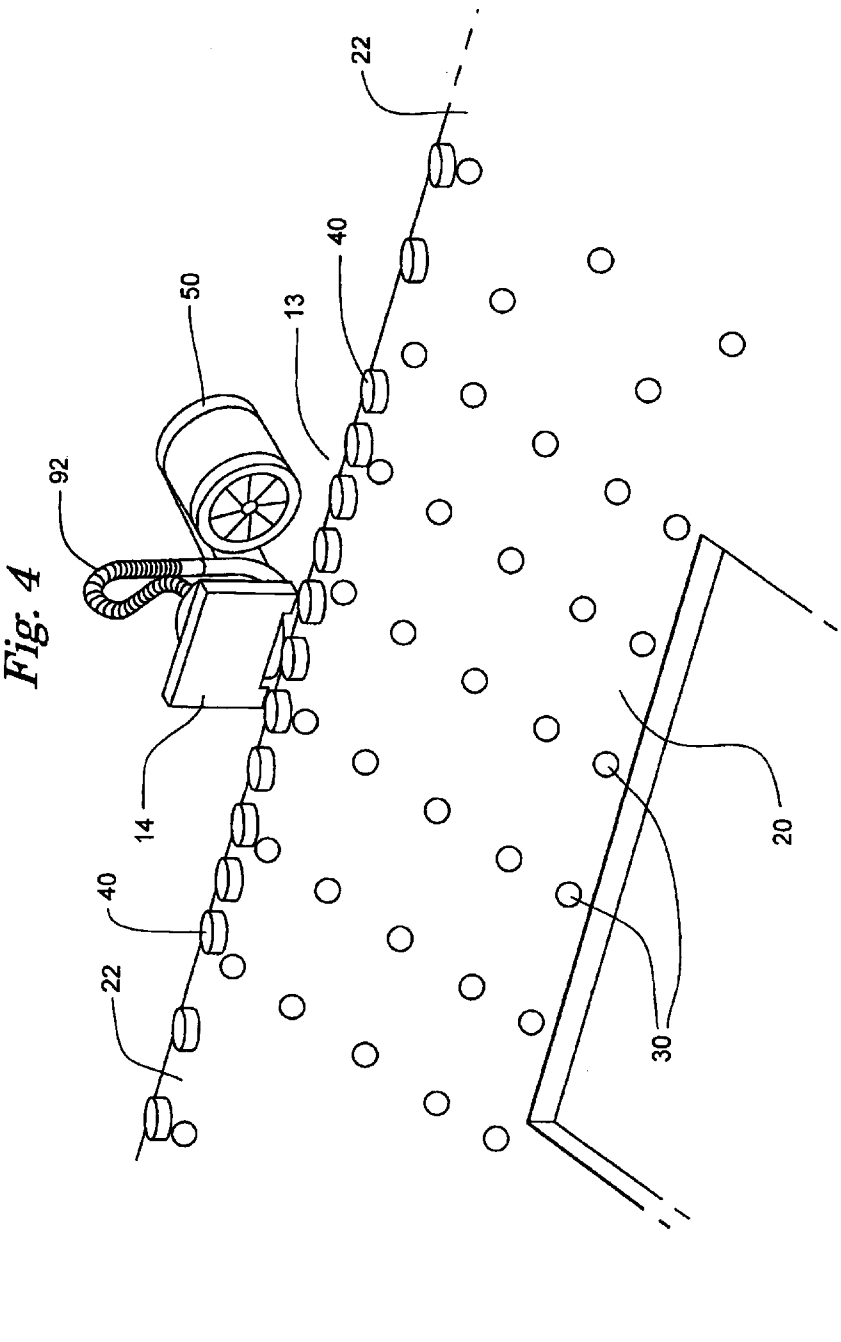
FIG. 4 is third enlarged perspective view of the coating removal apparatus.
Figure 5:
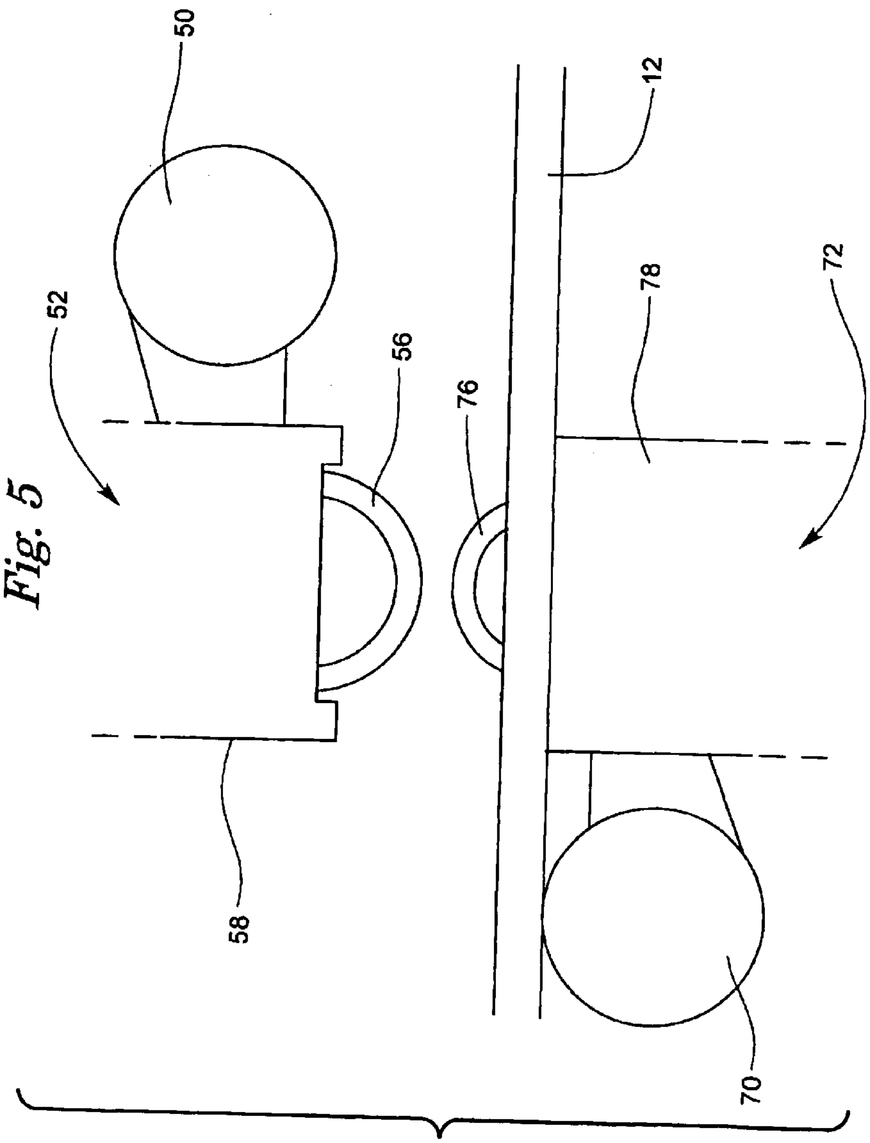
FIG. 5 is a close up view of the first and second grinding apparatuses.
Figure 6:
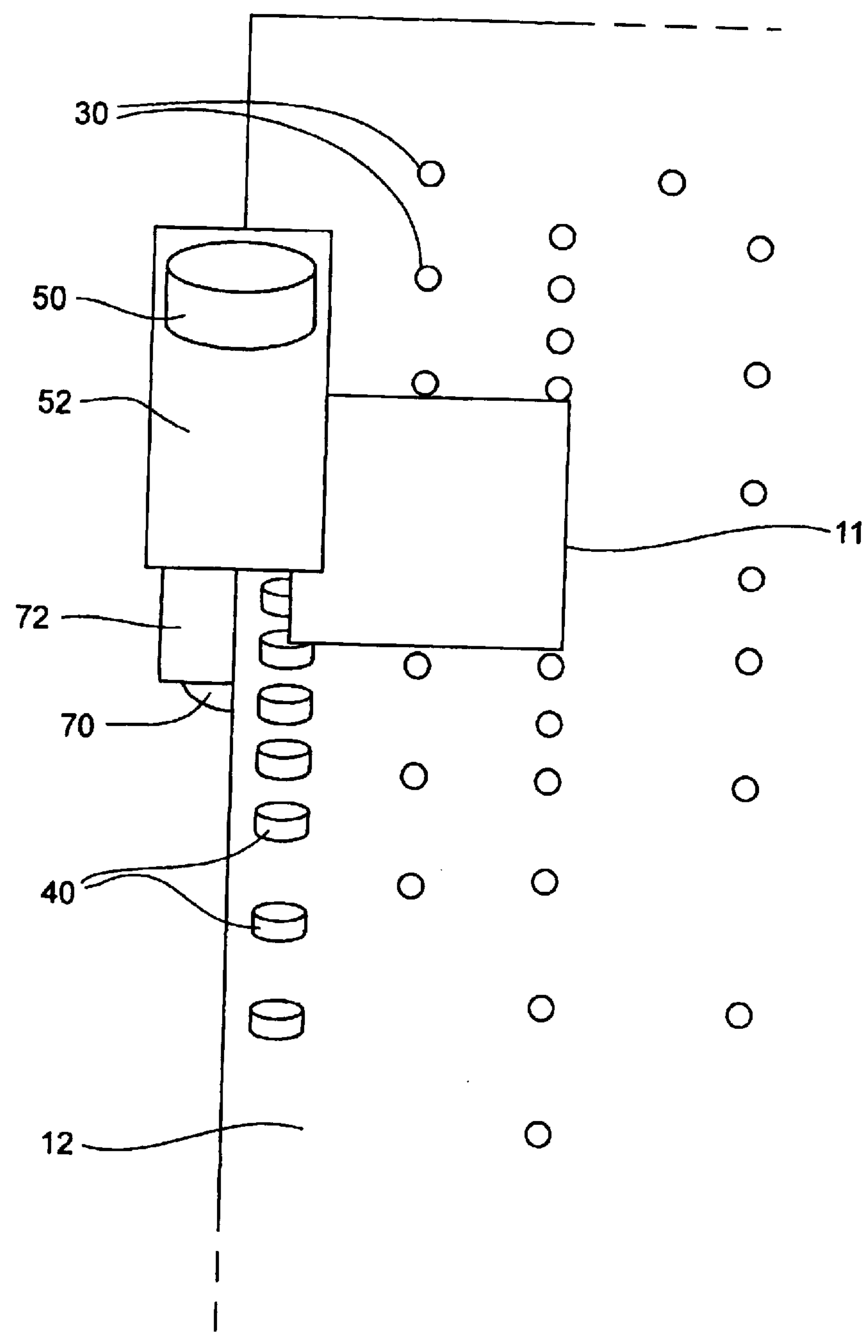
FIG. 6 is a front view of the coating removal apparatus.
Figure 7:
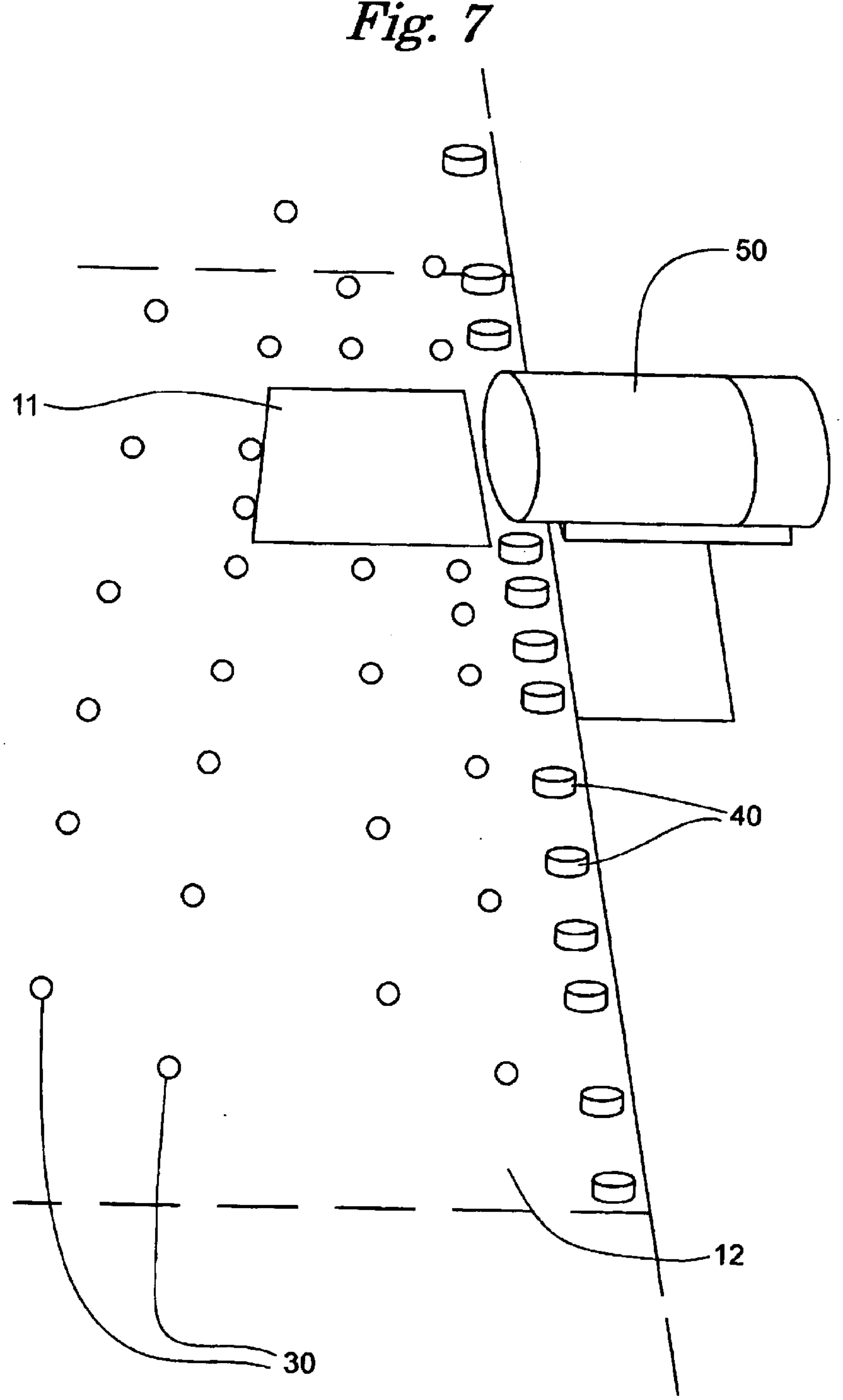
FIG. 7 is a back view of the coating removal apparatus.

For the purposes of consistent grinding of the coatings, it is desirable that the substrate 11 move smoothly along the surface of the table 12, and therefore, through the first and second grinding apparatuses 14, 16. To facilitate moving the substrate 11 along the surface of the table 12, the table 12 preferably includes a plurality of rollers 30 mounted thereon. The rollers are 30 mounted on the table 12 such that a space is maintained from one roller to the next. The space between the rollers may vary from a minimal space to a significant space but should not be so great as to provide inadequate support to the substrate. An example range of acceptable spacing for the rollers is to space them between 3 and 12 inches apart from each other. Preferably, the rollers 30 are spaced more closely together in the region of the table 12 proximate the first and second grinding apparatuses 14, 16. For example, one particularly preferred arrangement of rollers 30 is shown in FIG. 2. Any other suitable arrangement of the rollers on the table may be used to facilitate moving the substrate along the table. Additionally, a person of ordinary skill in the art will appreciate that alternative mechanisms may be used to facilitate moving the substrate 11 along the surface of the table 12. For example, the table may be provided with a belt or other driven surface, cylindrical rollers, or other surface configurations.

As seen in FIG. 2, the rollers are oriented to rotate about an axis that is substantially parallel with the axis of the table. The rollers may be individually configured in any suitable manner. In one configuration, each roller 30 includes a ball 32 and an enclosure 34 for mounting the ball 32 to the table 12. Each of the balls 32 is rotatably mounted within one of the enclosures 34. The rollers are desirably provided along a sufficient portion of the table surface to support the substrate selected for edge deletion. Each enclosure 34 preferably has an aperture 36 formed therein through which the ball 32 partially extends. To retain the ball 32 in the enclosure 34, the ball 32 is configured with a diameter that is slightly larger than that of the aperture 36. The extension of the ball beyond the enclosure provides a rolling surface for contact with the substrate.

A plurality of side rollers 40 is provided along an edge 42 of the table 12 to guide the substrate 11 as it passes between the first and second grinding apparatuses 14, 16. The side rollers 40 are each preferably oriented to rotate about an axis that is substantially normal to a surface of the table 12. The side rollers 40 are configured in a spaced-apart relationship so that the side rollers 40 span substantially the entire length of the edge 42. The spacing between the side rollers preferably ranges between 3 inches and 18 inches but may further vary as suitable for the application. Proximate the first and second grinding apparatuses 14, 16, the side rollers 40 are preferably spaced more closely together. As noted above, one particularly preferred arrangement of rollers 30 and side rollers 40 is shown in FIG. 2.

The first and second grinding apparatus 14 and 16, respectively, generally include a first motor and a second motor, 50 and 70, a first grinding head and a second grinding head, 52 and 72, and a height adjustment mechanism, 54 and 74. See FIG. 5 for a close up of the first and second motors and grinding heads. The first and second motors 50 and 70 are preferably alternating current motors. A person of ordinary skill in the art will appreciate that the type and size of the motor may be selected based upon a variety of factors such as the size of the grinding head and the composition and thickness of the coating being ground off the substrate. Any suitable type and size of motor may be used in conjunction with the invention. Alternatively, the substrate 11 may be held stationary and the first and second grinding apparatuses 14, 16 moved relative to the substrate 11.

The first and second grinding heads 52 and 72 preferably include, respectively, a first grinding wheel and a second grinding wheel, 56 and 76, and a first enclosure and a second enclosure, 58 and 78. The first and second grinding wheels 56 and 76 are fabricated from an abrasive material that is capable of grinding the coating off the substrate 11 as the grinding wheel 56 or 76 is rotated along the surface of the substrate 11 in the area where coating removal is desired. The substrate 11 moves along the table 12 to expose the edge portions thereof, where it is desired to remove the coatings, to the first and second grinding wheels 56 and 76 for simultaneous removal of the coatings from first and second generally opposed major surfaces through grinding action.

The first and second grinding wheels 56 and 76 are operably connected to, respectively, the first and second motors 50 and 70 such that when the first or second motor 50 and 70 is operated, the first or second grinding wheel 56 and 76 rotates. First and second circular belts (not shown) are preferably used to operably connect the first and second motors 50 and 70 to the first and second grinding wheels 56 and 76. However, a person of ordinary skill in the art will appreciate that alternative mechanisms may be used to operably connect the motor to the grinding wheel.

Figure 8:
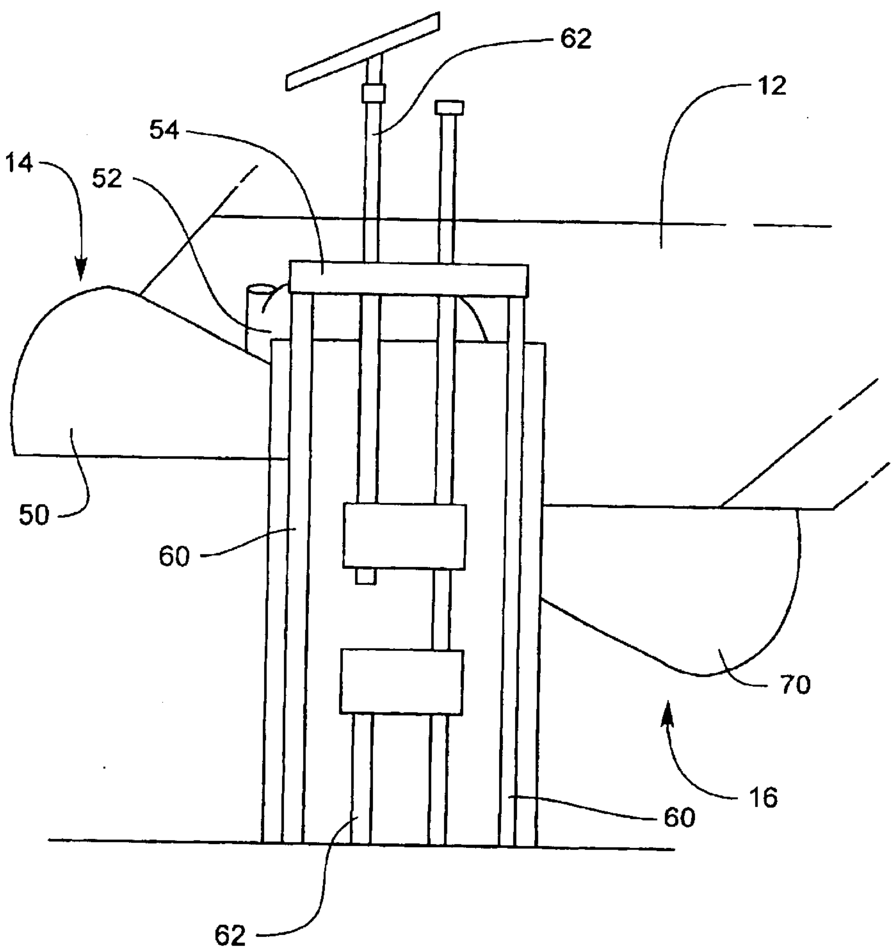
FIG. 8 is a view of the height adjustment mechanism.

Referring to FIG. 8, a first height adjustment mechanism 54 and a second height adjustment mechanism (not shown) control a distance between the grinding wheels 56 and 76, respectively, and the substrate to adjust the depth (or "thickness") of the coating to be ground off the substrate. Each height adjustment mechanism 54 preferably includes two guide posts 60. The guide posts 60 are mounted in a spaced-apart relationship substantially transverse to the surface of the table 12. Each height adjustment mechanism 54 also includes a threaded shaft 62 that is mounted substantially transverse to the surface of the table 12 so that the threaded shaft 62 is located intermediate the guide posts 60 and is rotatable about a central axis thereof. Each grinding head 52 or 72 is operably attached to a respective height adjustment mechanism. In the embodiment shown in FIG. 8, each grinding head 52 or 72, is operably attached to a respective threaded shaft 62 so that rotation of the threaded shaft 62 causes the grinding head 52 or 72 to move vertically (e.g., in a directly vertical direction) with respect to the table 12. Rotation of either threaded shaft 62 causes the respective grinding head 52 or 72 to move vertically with respect to the table. Alternatively, the height adjustment mechanism may be configured such that rotation of the threaded shaft 62 in a first direction (e.g., clockwise) causes the grinding heads 52, 72 to move towards each other and rotation of the threaded shaft 62 in a second direction (e.g. counter-clockwise) causes the grinding heads 52, 72 to move apart from each other. The threaded shaft 62 thereby allows the amount (i.e., thickness) of material that is ground off the substrate 11 to be adjusted. It is noted that the vertical movement of the grinding heads 52 or 72 is preferably directly along a vertical axis with no horizontal component to the movement. Thus, the vertical position of the grinding heads 52 or 72 may be precisely adjusted.

Figure 9:
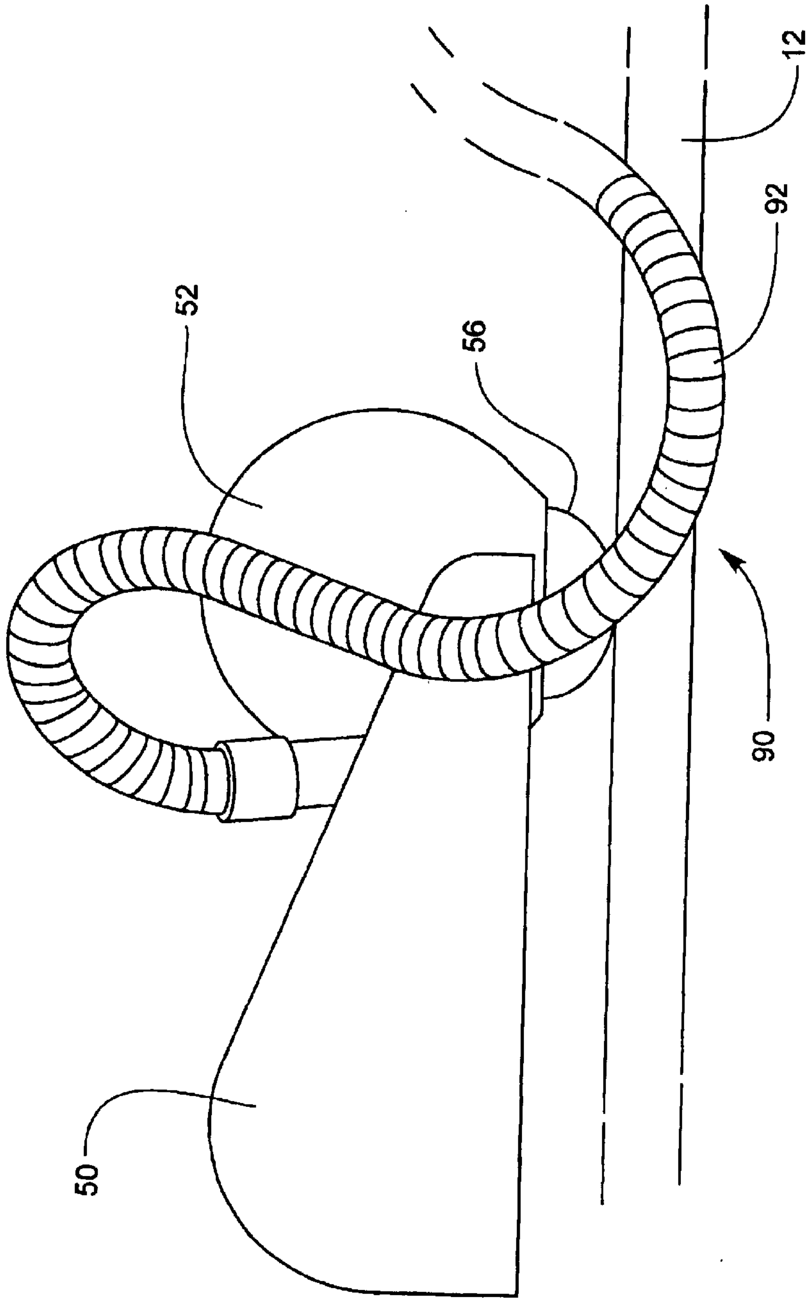
FIG. 9 is a view of the dust collection mechanism.

FIG. 9 illustrates a dust collection system 90 is for use with the coating removal apparatus 10. The dust collection system is provided to reduce the potential for the substrate 11 to become damaged (e.g., by coating dust particles becoming adhered to the surface of the glass), to reduce the mess created by the dust generated during the grinding process, and also as a safety precaution (as certain coating dust may be explosive). The dust collection system 90 includes a hose 92 that is operably connected to the grinding head enclosure 58. Suction is applied through the hose 92 to draw dust generated by the grinding process into the hose 92 and to permit the dust to be collected and disposed of.

In operation, the substrate 11 is placed on the table 12 to position an edge portion of the substrate 11, where it is desired to remove the coating, substantially adjacent to the side rollers 40. During initial placement, it may be preferable that the substrate 11 not be between the grinding heads 14, 16. It is noted that the disclosed method and apparatus are particularly suited for removing the coatings from the generally opposed first and second major surfaces of a glass sheet.

With reference to FIG. 1, it may be preferable to remove coatings from both sides of the substrate 11, particularly along an entire periphery of each coated major surface. Thus, each of the four peripheral regions of the substrate 11 may be moved between the grinders 14, 16 in succession. That is, a first peripheral region of the substrate 11 may be moved between the grinding apparatuses 14, 16. Thereafter, a second peripheral region of the substrate 11 may be moved between the grinding apparatuses 14, 16. This process may be repeated until the coating on the entire periphery of each major surface has been removed in the four peripheral regions. Alternately, multiple first and second grinding apparatuses 14, 16 may be provided along a support surface for movement of the substrate 11 through the multiple grinding apparatuses 14, 16 to remove the coatings from an entire periphery of each major surface along four peripheral regions. Or course, these configurations or uses are not required by the invention. Rather, the present apparatus and method may be used in any desired manner to remove at least some coating from opposed surfaces of a substrate.

Power is applied to the first and second motors 50, 70, causing the grinding wheels 56, 76 to rotate and the substrate 11 is moved along the side rollers 40 so that the substrate 11 passes between the grinding wheels 56, 76. As the substrate 11 passes between the grinding wheels 56, 76, the grinding wheels 56, 76 simultaneously remove the coatings from the first and second surfaces of the substrate 11 along the path of the grinding wheels 56, 76. A width of the coating that is removed from the surfaces of the substrate 11 may be varied by adjusting a distance that the grinding heads 56, 76 extend onto the substrate 11.

It is contemplated that features disclosed in this application, as well as those described in the above applications incorporated by reference, can be mixed and matched to suit particular circumstances. Various other modifications and changes will be apparent to those of ordinary skill.

What is claimed is:

1. An apparatus for removing coatings from portions of first and second surfaces of a substrate, the portions comprising a width and a depth of coatings to be removed, the apparatus comprising: a table having a table surface for slidable receipt of a substrate, the table including a mounting portion and an access recess for an operator; a first grinding apparatus mounted at the mounting portion of the table; a second grinding apparatus mounted at the mounting portion of the table, opposite the first grinding apparatus; and a first height adjustment mechanism to control a distance of the first grinding apparatus from the substrate and a second height adjustment mechanism to control a distance of the second grinding apparatus from the substrate.

2. An apparatus for removing coatings from portions of first and second surfaces of a substrate, the portions comprising a width and a depth of coatings to be removed, the apparatus comprising: a table having a mounting portion and a table surface configured for slidable receipt of a substrate, the table surface including a plurality of rollers for slidable receipt of the substrate, the rollers being spaced apart from one another and including balls and enclosures for supporting the balls; a first grinding apparatus mounted at the mounting portion of the table; and a second grinding appanitus mounted at the mounting portion of the table, opposite the first grinding apparatus.

3. An apparatus for removing coatings from portions of first and second surfaces of a substrate, the portions comprising a width and a depth of coatings to be removed, the apparatus comprising: a table having a mounting portion and a table surface configured for slidable receipt of a substrate, the table surface having an axis and including a plurality of rollers for slidable receipt of the substrate, the rollers being spaced apart from one another and being oriented to rotate about an axis that is substantially parallel with the axis of the table surface; a first grinding apparatus mounted at the mounting portion of the table; and a second grinding apparatus mounted at the mounting portion of the table, opposite the first grinding apparatus.

4. An apparatus for removing coatings from portions of first and second surfaces of a substrate, the portions comprising a width and a depth of coatings to be removed, the apparatus comprising: a table having a mounting portion and a table surface configured for slidable receipt of a substrate, the table including an access recess; a first grinding apparatus mounted at the mounting portion of the table; and a second grinding apparatus mounted at the mounting portion of the table, opposite the first grinding apparatus.

5. The apparatus of claim 4, wherein the table comprises a central section having a first end and a second end, a first end section extending from the first end of the table and a second end section extending from the second end of the table, the first end section and the second end section spaced parallel and apart from one another to form the access recess.

6. An apparatus for removing coatings from portions of first and second surfaces of a substrate, the portions comprising a width and a depth of coatings to be removed, the apparatus comprising: a table having a mounting portion and a table surface configured for slidable receipt of a substrate, the table surface including a plurality of side rollers for supporting a portion of the substrate proximate the first and second grinding apparatuses; a first grinding apparatus mounted at the mounting portion of the table; and a second grinding apparatus mounted at the mounting portion of the table, opposite the first grinding apparatus.

7. An apparatus of claim 6, wherein the side rollers are oriented to rotate about an axis that is substantially normal to the surface of the table.

8. An apparatus for removing coatings from portions of first and second surfaces of a substrate, the portions comprising a width and a depth of coatings to be removed, the apparatus comprising: a support surface configured for slidable receipt of a substrate, the support surface including a mounting portion; a first grinding apparatus mounted at the mounting portion of the support surface; a second grinding apparatus mounted at the mounting portion of the support surface, opposite the first grinding apparatus; and a motor to drive both the first and second grinding apparatuses.

9. An apparatus for removing coatings from portions of first and second surfaces of a substrate, the portions comprising a width and a depth of coatings to be removed, the apparatus comprising: a support surface configured for slidable receipt of a substrate, the support surface including a mounting portion; a first grinding apparatus mounted at the mounting portion of the support surface; a second grinding apparatus mounted at the mounting portion of the support surface, opposite the first grinding apparatus; and a first height adjustment mechanism to control a distance of the first grinding apparatus from the substrate and a second height adjustment mechanism to control a distance of the second grinding apparatus from the substrate, wherein the first and second height adjustment mechanisms are configured for simultaneous movement of the first and second grinding apparatuses toward or away from one another.

10. An apparatus for removing coatings from portions of first and second surfaces of a substrate, the portions comprising a width and a depth of coatings to be removed, the apparatus comprising: a support surface configured for slidable receipt of a substrate, the support surface including a mounting portion; a first grinding apparatus mounted at the mounting portion of the support surface; a second grinding apparatus mounted at the mounting portion of the support surface, opposite the first grinding apparatus; and a first height adjustment mechanism to control a distance of the first grinding apparatus from the substrate and a second height adjustment mechanism to control a distance of the second grinding apparatus from the substrate, wherein the first and second height adjustment mechanisms each comprises two guide posts, a threaded shaft being located intermediate the guide posts and being rotatable about a central axis thereof, the first and second grinding apparatuses being operably attached to the threaded shaft such that rotation of the threaded shaft causes the first and second grinding apparatuses to move vertically with respect to the table.

11. An apparatus for removing coatings from portions of first and second surfaces of a substrate, the portions comprising a width and a depth of coatings to be removed, the apparatus comprising: a support surface configured for slidable receipt of a substrate, the support surface including a mounting portion; a first grinding apparatus mounted at the mounting portion of the support surface; a second grinding apparatus mounted at the mounting portion of the support surface, opposite the first grinding apparatus; and a first height adjustment mechanism to control a distance of the first grinding apparatus from the substrate and a second height adjustment mechanism to control a distance of the second grinding apparatus from the substrate, wherein the first and second height adjustment mechanisms control a distance of the first grinding apparatus from the substrate and a distance of the second grinding apparatus from the substrate while maintaining a horizontal position of the first and second grinding apparatuses.

12. An apparatus for removing coatings from portions of first and second surfaces of a substrate, the portions comprising a width and a depth of coatings to be removed, the apparatus comprising: a support surface configured for slidable receipt of a substrate, the support surface including a mounting portion; a first grinding apparatus mounted at the mounting portion of the support surface; a second grinding apparatus mounted at the mounting portion of the support surface, opposite the first grinding apparatus; and a dust collection system.

* * * * *